United States Patent
Thiel

(10) Patent No.: US 6,786,552 B2
(45) Date of Patent: Sep. 7, 2004

(54) CATCH HOOK FOR A BACKREST ADJUSTMENT ARMATURE IN THE SEATS OF MOTOR VEHICLES

(75) Inventor: Peter Thiel, Remscheid (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/257,653

(22) PCT Filed: Apr. 14, 2001

(86) PCT No.: PCT/EP01/04269

§ 371 (c)(1),
(2), (4) Date: Oct. 16, 2002

(87) PCT Pub. No.: WO01/83258

PCT Pub. Date: Nov. 8, 2001

(65) Prior Publication Data

US 2003/0132656 A1 Jul. 17, 2003

(51) Int. Cl.⁷ ................................................ B60N 2/02
(52) U.S. Cl. ................................................ 297/378.12
(58) Field of Search .......................... 297/361.1, 378.1, 297/378.12; 292/11, 28, 50

(56) References Cited

U.S. PATENT DOCUMENTS 5,904,403 A * 5/1999 Unckrich

FOREIGN PATENT DOCUMENTS

| DE | 3828223 | 9/1989 |
| DE | 4326623 | 2/1995 |
| FR | 2539603 | 6/1984 |
| GB | 2224200 | 5/1990 |

* cited by examiner

Primary Examiner—Milton Nelson, Jr.
(74) Attorney, Agent, or Firm—Friedrich Kueffner

(57) ABSTRACT

A catch hook for a backrest adjustment armature in seats of motor vehicles, which hook is mountable rotatably on a part of the armature to lock and release it. The armature part is designed to pivot forward together with a part of the seat and to rest, when in a locked position, against a stop on a base frame of the seat. Force is exerted on the catch hook by a stored-energy device in the locking direction. The opening of the catch hook gripping behind the stop when in the locked position, where a tension latch, which also grips behind the stop when in the locked position, is arranged next to the catch hook. The latch itself is pivotably supported on the catch hook so that it can, as needed, be released from the locked position by an actuating element. The tension latch is connected to the catch hook by way of support elements so that it can move in advance of the catch hook in a direction of travel. Force in the locking direction is exerted only on the tension latch by a single stored-energy device. The catch hook is held in the locked position only by the working connection established by way of the support elements. A projection on the catch hook, which is in working connection with a stop bump on the armature part, limits the pivoting movement of the catch hook in the clockwise direction, and the catch hook is thus held in a position in which it is ready to travel past the stop.

5 Claims, 2 Drawing Sheets

CATCH HOOK FOR A BACKREST ADJUSTMENT ARMATURE IN THE SEATS OF MOTOR VEHICLES

The invention pertains to the catch hook for a backrest adjustment armature in the seats of motor vehicles, which hook is mounted rotatably on a part of the armature to lock and release it, the armature part being designed to pivot forward together with a part of the seat and to rest, when in the locked position, against a stop on the base frame of the seat, force being exerted on the catch hook by a stored-energy device in the locking direction, the opening of the catch hook gripping behind the stop when in the locked position, where a tension latch, which also grips behind the stop when in the locked position, is arranged next to the catch hook, the latch itself being pivotably supported on the catch hook so that it can, as needed, be released from the locked position by an actuating element.

In the case of the catch hook described in DE 43 26 623 C2 for locking and releasing part of a backrest adjustment armature, which can pivot forward together with a part of the seat, a latch-like locking hook is again arranged next to the catch hook. This locking hook is connected to the catch hook by way of a driver, which gives the locking hook a certain freedom of movement. When the catch hook is in the locked position, the locking hook supports the catch hook and prevents it from sliding away from the stop attached to the seat part. A stored-energy device acting on the locking hook holds the locking hook against the catch hook, the locking hook being mounted with freedom of rotation on the catch hook. The locking hook also has a locking section, which, when the catch hook is in the locked position, is supported against an opposing support piece rigidly attached to the armature part. In addition, the axle journal of the catch hook is surrounded by a slot in the locking hook, which slot extends in the pivoting direction of the locking hook, the locking hook being put under tension with respect to the catch hook by an additional stored-energy device. In the normal position of the backrest, therefore, because one end of the locking hook is positively supported by the axle extending between the catch hook and the locking hook and the other end is supported on the opposing support piece of the armature part, the locking hook keeps the catch hook in a defined, ready-to-lock position against the stop of the seat part. At the same time, one end of the catch hook is supported on the axle journal of the armature part, while the other end is supported by its driver on the locking hook. Thus the catch hook is prevented from slipping at the start of a crash and remains in position. Nevertheless, this solution does not make it possible reliably to prevent the unused seats from making rattling noises.

Another previously known solution according to DE 38 28 223 C1 also discloses a catch hook with a tension latch next to it, but here both the catch hook and the tension latch are supported on the same bearing shaft attached to the armature part. Both the catch hook and the tension latch extend around a stop peg on the base frame of the seat. Whereas the catch hook serves primarily to retain the locked position, the role of the tension latch is to eliminate play by tensioning the armature part against the base frame of the seat. The catch hook and the tension latch can be moved by an actuating means in the form of, for example, a Bowden cable, in such a way that, upon the release of the armature part, first the catch hook and then the tension latch are pivoted away from the shaft. For this reason, both the catch hook and the tension latch have their own separate spring elements, by means of which the locked position of the catch hook and the locked position of the tension latch are restored after the backrest is tipped back again. The simultaneous arrangement of the catch hook and the tension latch on one and the same bearing shaft requires that the tensioning surface on the tension latch have a specific contour in the form of a wedge. Because the release movement of the tension latch trails after the release movement of the catch hook, the wedging effect which occurs means that, after the initial actuation of the release lever, extra force must then be exerted on the release lever to overcome the resistance. The ease with this system can operated therefore leaves something to be desired. In addition, the use of two restoring springs is also detrimental to the ease of operation, because, once the force of the first restoring spring has been overcome after a certain phase of the actuating movement, there is still the force of a second spring to be overcome. This makes it even more difficult to operate the system, in the sense that the amount of actuating force which must be expended is greater than it should be.

The task of the invention is not only to produce a rattle-free locking of the armature part to the base frame of the seat, but especially to facilitate the actuation of the catch hook and the tension latch for the purpose of increasing the ease of operation. This task is accomplished by the features cited in the characterizing clause of Claim 1. Although it is true that the actuating force originally introduced to release the catch must increase slightly over the course of the actuating distance as a result of the spring characteristic, it does not need to increase abruptly at a certain point over the course of the actuating distance, namely, at the point when the tension latch starts to carry along the catch hook, because the friction-producing effect caused by the contact between the tension latch and the stop has already been eliminated at the beginning of the release movement. The catch hook itself grips behind the stop on the base frame of the seat without a wedging effect, so that negligible force is required for the tension latch to drive the catch hook in the release direction. It is advantageous for the release force to be hinged to a release peg of the tension latch by way of an actuating element designed preferably as a Bowden cable.

In a first embodiment, support fingers, which act as support elements in addition to the axle journal which supports the tension latch on the catch hook, are formed by an opening in the tension latch and extend around the head of the shaft which supports the catch hook on the armature part. The opening surrounds the head of the shaft with play, so that the support fingers are a certain distance away from the circumference of the head of the shaft. As a result, the tension latch is able to move in advance of the catch hook when the release movement is initiated.

In another exemplary embodiment of the object of the invention, the release peg has a projection, which engages in a slot in the catch hook to serve as a support element in addition to the axle journal which supports the tension latch on the catch hook. This slot curves around the bearing journal, remaining equidistant from it, and is designed so that the tension latch can pivot freely over a short distance in the above-mentioned slot until the projection ultimately comes to rest against the upper edge of the slot, from which point on the tension latch carries the catch hook along with it.

The invention is illustrated in the drawing on the basis of exemplary embodiments and is explained in greater detail below:

FIG. 1, in the form of a schematic, highly reduced side view, shows the seat of a motor vehicle equipped with armatures, the backrest being in normal position;

It should be pointed out first that, in the exemplary embodiments shown here, only the components required for an understanding of the object of the invention are presented; for the sake of clarity, reinforcing pleats, embossings, and connecting means which are not necessary to understand the object of the invention have been left out.

Figure 1:
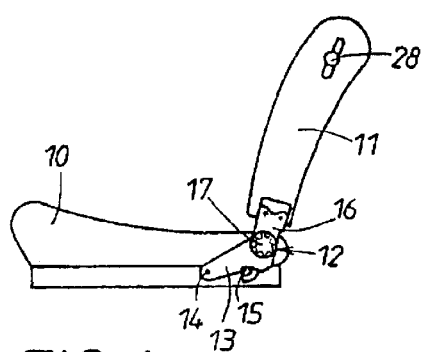

The motor vehicle seat shown in FIG. 1 comprises a seat part 10 and a backrest part 11. A backrest adjustment armature 12 is provided on each of the two long sides of the vehicle seat between the seat part 10 and the backrest 11. The lower part 13 of the armature, which is assigned to the seat part 10, is mounted rotatably on a peg 14, attached to the base frame of the seat part 10. In the normal position of the backrest 11, the lower armature part 13 is supported on a peg-like stop 15, also attached to the base frame of the seat part 10. An upper armature part 16 is rigidly attached to the backrest 11 and is connected to the lower armature part 13 by way of an adjusting and locking device 17.

To provide the users of two-door passenger vehicles with easier access to the rear seat of the vehicle, the backrest 11 can be pivoted forward over the seat part 10; while the backrest 11 is being pivoted over the seat part 10, it is advisable for the fixed position established between the armature part 13 and the armature part 16 to be preserved, so that the angle between the backrest and the seat part present before the pivoting will be restored again when the backrest is tipped back into its normal position. This makes it unnecessary to adjust the angle of the backrest again by using the adjusting and locking device. Together with the backrest 11, the backrest adjusting armatures located on the two sides of the vehicle seat are also pivoted forward around the pegs 14, because the adjusting and locking device makes a rigid unit out of the armature parts 13 and 16.

In the normal position of the backrest, the lower edge of the armature part 13 rests against the stop 15, which is a permanent part of the seat and which can be formed, for example, by a section of a peg or tube with a circular cross section. To prevent the backrest 11 from being tipped forward unintentionally, a catch hook 18 on the lower armature part 13 is pivotably supported on an axle journal 19, rigidly attached to the armature part 13; the hook opening 20 of this catch hook grips behind the stop 15 in the circumferential area of the stop opposite the contact zone with the armature part 13. The axle journal 19 is attached to the lower armature part 13 in such a way that, looking in the direction of travel, it is somewhat above the stop 15, but offset toward the front. A bearing shaft 21, on which a tension latch 22 is supported next to the catch hook 18 with freedom to pivot with respect to the catch hook 18, projects laterally from the catch hook 18 on the side facing away from the armature part 13, this bearing shaft being on the same horizontal plane as the axle journal 19, but offset slightly toward the rear. This tension latch 22 is also designed as a hook, but in the exemplary embodiment shown in FIG. 2, it has an opening 23 in the end pointing in the travel direction. This opening forms support fingers 24 and 25, which extend around the head 26 of the axle journal 19 with play on the upper and lower side. On approximately the same horizontal plane on which the axle journal 19 and the bearing shaft 21 are arranged, there is also a release stud 27, attached to the tension latch 22 and projecting slightly from it, with a slight offset toward the rear with respect to the stop 15. This release stud 27 serves to establish a connection with an actuating element 28, installed, for example, in the upper part of the backrest. The connection between the actuating element 28 and the release stud 27 can be accomplished by way of a tension element 29, designed, for example, as a Bowden cable. To maintain the locked position shown in FIG. 2 of the catch hook 18 and especially also of the tension latch 22, this latch 22 has an opening 30 underneath its support point on the bearing shaft 21, into which opening a stored-energy device 31, designed as a tension spring, for example, is hooked, the other end of the spring being attached to an opposing support element on the armature part 13 designed as, for example, a hook-in hole 32. At the end extending around the axle journal 19, the catch hook 18 is provided with a projection 33, which, in cooperation with a stop bump 34 on the lower armature part 13, prevents the catch hook 18 from pivoting so far forward as a result of the force of gravity after the backrest 11 has been tipped forward and the actuating element 28 has been released that the catch hook 18 is unable to travel past the stop 15 when the backrest is tipped back to its normal position. Thus, because the projection 33 cooperates with the stop bump 34 to hold the catch hook 18 in a position in which it is able to move over the stop 15, it is ensured that, when the backrest 11 is pivoted back to its normal position from its forward-tipped position, the forward bevel 35 on the hook opening 20 can continue to slide back after it makes contact with the stop 15.

Figure 2:
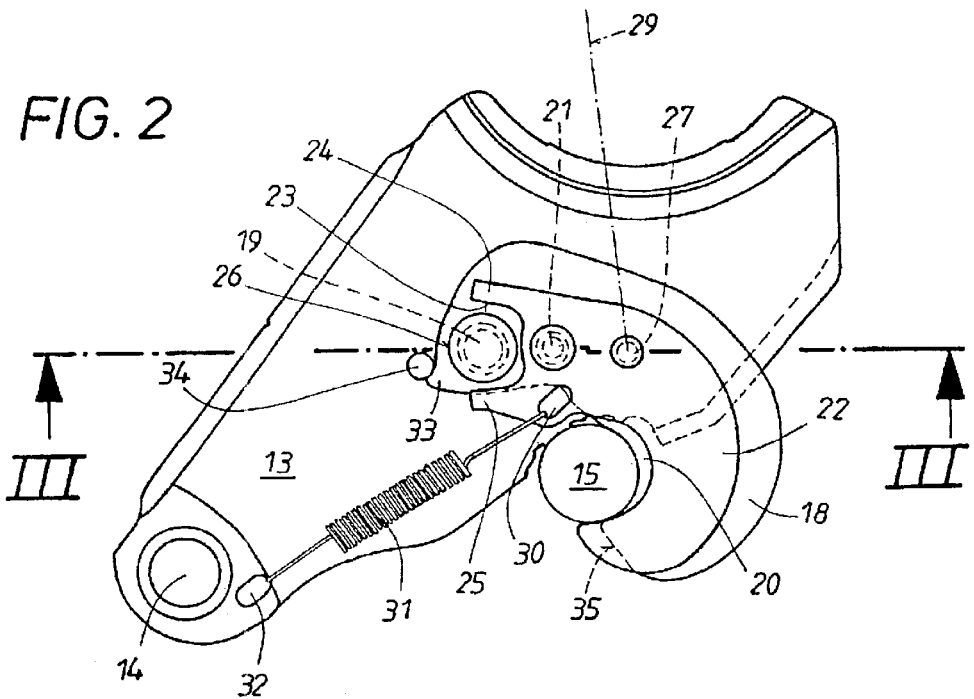
FIG. 2 shows a side view of the lower armature part of a backrest adjustment armature on a larger scale than FIG. 1, this lower armature part being installed on one of the long sides of the vehicle seat and equipped with a catch hook, where both the catch hook and the tension latch are in the locked position.

When now, proceeding from the locked position shown in FIG. 2, only the tension latch 22 is pivoted in the counterclockwise direction around the bearing shaft 21 by way of the actuating element 28 and the tension element 29, the support finger 24 strikes the head of the bearing journal 19, without, so far, the catch hook 18 itself being pivoted. Only after the support finger 24 has come to rest against the head 26 of the axle journal 19 does the catch hook 18 also start to pivot along in the counterclockwise direction as the tension latch 22 continues to pivot in the counterclockwise direction around the bearing shaft 21. As a result, the hook opening 20 moves away from the stop 15, so that it is now possible for the backrest 11 to be pivoted forward. The support finger 24 and the head 26 of the axle journal 19 thus cooperate to form support elements which makes it possible for the tension latch 22 to move in advance of the catch hook 18.

Figure 3:
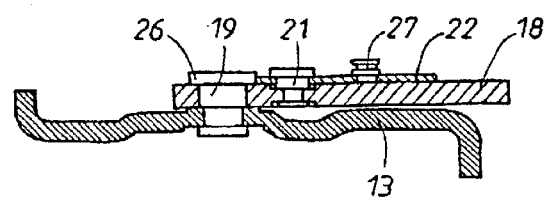
FIG. 3 shows a longitudinal cross section of the armature part according to FIG. 2 with the catch hook arrangement along line III—III of FIG. 2.
Figure 4:
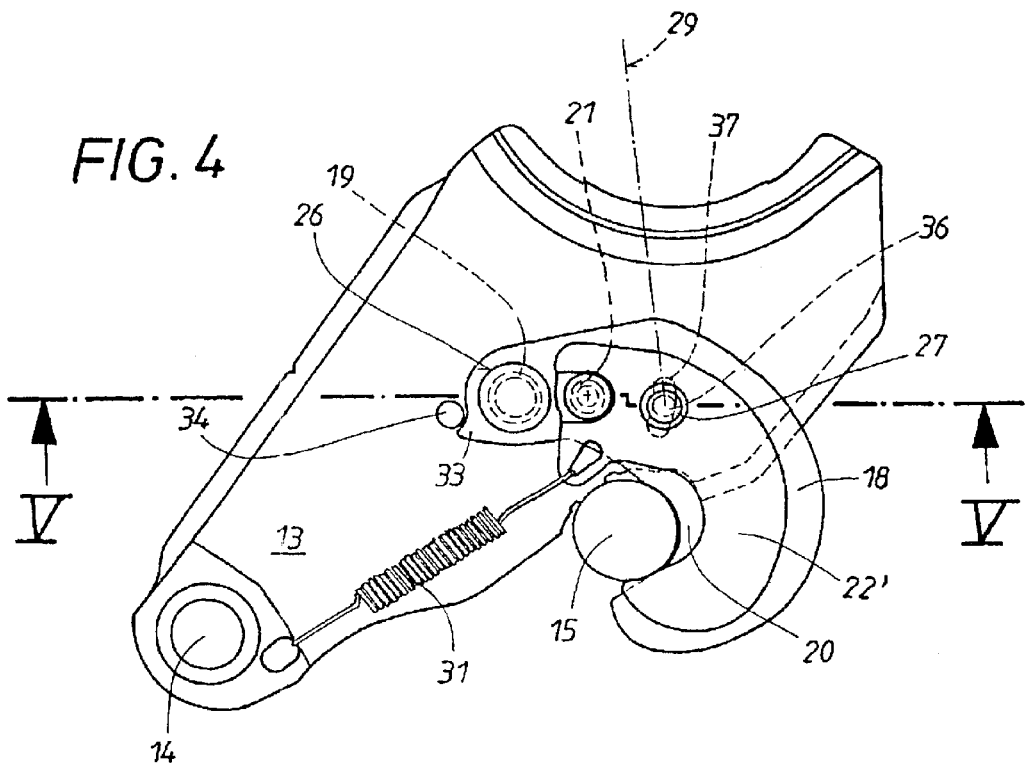
FIG. 4 shows another exemplary embodiment of a catch hook arrangement on a lower armature part in a view similar to FIG. 2.
Figure 5:
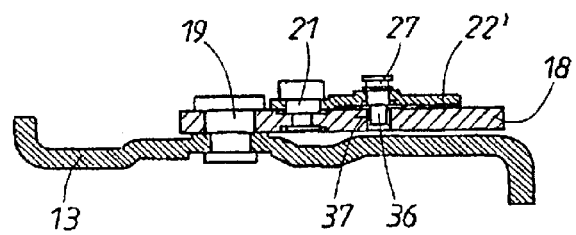
FIG. 5 shows a longitudinal cross section along line V—V of FIG. 4 of the catch hook and tension latch arrangement on the lower armature part shown in FIG. 4.

The exemplary embodiment shown in FIGS. 4 and 5 corresponds essentially to that illustrated in FIGS. 2 and 3. In contrast to the exemplary embodiment shown in FIG. 4, however, the tension latch 22' is shortened and does not have an opening which extends around the head 26 of the axle journal 19. Instead, the release stud 27 has a projection 36, which engages in a slot 37 in the catch hook 18. The slot 37 curves around the bearing shaft, i.e., the shaft on which the tension latch 22 is supported on the catch hook 18, remaining equidistant from the shaft at all points.

When now, proceeding from locked position shown in FIG. 4, the tension member 29 and the release stud 27 are used to pivot the tension latch 22' upward in the counterclockwise direction around the bearing shaft 21, the catch hook 18 remains initially in the position shown until the projection 26 comes to rest against the upper edge of the slot 27. Only thereafter, as tension continues to be exerted on the release stud 27, is the catch hook 18 carried along in the counterclockwise or release direction. The catch hook now also swings free of the stop 15, and the backrest can be tipped forward. As soon as the actuating element 28 is released and thus there is no longer any force being transmitted by the tension element 29, the previously tensioned stored-energy device 31 causes the tension latch 22' and thus also the catch hook 18 to pivot backward. Because of its projection 33 and the stop bump 34, however, the catch hook cannot pivot backward beyond a certain point in the clockwise direction. It is thus held at this point, so that its contact surface on the hook opening 20 can travel over the stop 15 as the backrest 11 is being tipped back until it can finally engage behind the stop.

In both cases the catch hook 18 serves to absorb load in the event of a crash, whereas the design of the tension latch 22, 22' makes it possible for the armature part 13 and the tension latch 22, 22' to be connected positively and without rattling to the stop 15.

As previously mentioned, the embodiments presented and described above represent only examples of the object of the invention, which is in no way limited to them. On the contrary, there are many other conceivable types of designs and embodiments of the object of invention. In addition, all of the features which can be derived from the drawings and the description are essential to the invention even if not explicitly cited in the claims.

List of Reference Numbers 10 seat part
11 backrest
12 backrest adjusting armature
13 armature part, lower
14 peg
15 stop
16 armature part, upper
17 adjusting and locking device
18 catch hook
19 axle journal, on 13
20 hook opening, of 18
21 bearing shaft
22 tension latch
22' tension latch
23 opening
24 support finger
25 support finger
26 head of 19
27 release stud
28 actuating element
29 tension element
30 opening
31 stored-energy device, tension spring
32 projection
33 stop bump
35 bevel on 18
36 projection
37 slot

What is claimed is:

1. A catch hook for a backrest adjustment armature in seats of motor vehicles, which hook is mountable rotatably on a part (13) of the armature to lock and release it, the armature part (13) being designed to pivot forward together with a part of the seat and to rest, when in a locked position, against a stop (15) on a base frame of the seat, force being exerted on the catch hook by a single stored-energy device in the locking direction via a tension latch (22, 22'), the opening (20) of the catch hook gripping behind the stop (15) when in the locked position, where the tension latch (22, 22'), which also grips behind the stop (15) when in the locked position, is arranged next to the catch hook (18), the latch itself being pivotably supported on the catch hook (18) so that it can, as needed, be released from the locked position by an actuating element (28), and where the tension latch (22, 22') is connected to the catch hook (18) by way of support elements (24, 26; 36, 37) in such a way that it can move in advance of the catch hook in a direction of travel, wherein force in the locking direction is exerted only on the tension latch (22, 22') by the single stored-energy device (31);

the catch hook (18) is held in the locked position only by the working connection established by way of the support elements (24, 26; 36, 37); and by means of a projection (33) on the catch hook (18), which is in working connection with a stop bump (34) on the armature part (13), the pivoting movement of the catch hook (18) is limited in the clockwise direction, and the catch hook (18) is thus held in a position in which it is ready to travel past the stop (15).

2. Catch hook according to claim 1, wherein the actuating element (28), which is connected in particular to a tension element (29), is connected to a release stud (27) of the tension latch (22).

3. Catch hook according to claim 2, wherein the release stud (27) has a projection (36), which functions as support element in addition to an axle journal (19), which supports the tension latch (22) on the catch hook (18), where the projection engages in a slot (37) in the catch hook (18), which slot curves around a bearing shaft (21), remaining equidistant from it.

4. Catch hook according to claim 1, wherein the support elements include fingers, which are formed by an opening (23) in the tension latch (22) and which extend around a head (26) of an axle journal (19) supporting the catch hook (18) on the armature part (13), that act as support elements in addition to the axle journal (19) which supports the tension latch (22) on the catch hook (18).

5. Catch hook according to claim 4, wherein the opening (23) extends around the head (26) of the axle journal (19) with play, and in that the support fingers are a certain distance away from a circumference of the head (26).

* * * * *

UNITED STATES PATENT AND TRADEMARK OFFICE
CERTIFICATE OF CORRECTION

PATENT NO.        : 6,786,552 B2
APPLICATION NO. : 10/257653
DATED             : September 7, 2004
INVENTOR(S)       : Peter Thiel Page 1 of 1

It is certified that error appears in the above-identified patent and that said Letters Patent is hereby corrected as shown below:

On The Title Page, Item

[30]         Foreign Application Priority Data, add

May 4, 2000     (DE)    Germany..................100 21 768

Signed and Sealed this

Thirtieth Day of October, 2007

JON W. DUDAS
*Director of the United States Patent and Trademark Office*